United States Patent [19]

Meeder

[11] 4,228,194
[45] Oct. 14, 1980

[54] ELECTRICALLY CONDUCTIVE ARTICLE AND METHOD OF MAKING THE SAME

[76] Inventor: Ernest P. Meeder, 726 Fairview Ave., Glen Ellyn, Ill. 60137

[21] Appl. No.: 38,730

[22] Filed: May 14, 1979

[51] Int. Cl.$^2$ .............................................. D04H 1/00
[52] U.S. Cl. ..................................... 428/288; 427/113; 428/297; 428/303; 428/367; 428/378; 428/379; 428/391; 428/408; 428/423.1; 428/425.5; 428/922
[58] Field of Search ............... 428/285, 286, 289, 290, 428/295, 297, 298, 302, 361, 367, 368, 378, 379, 383, 387, 391, 408, 425, 457, 462, 463, 922, 303, 288; 427/113, 220, 221

[56] References Cited

U.S. PATENT DOCUMENTS

| | | | |
|---|---|---|---|
| 2,099,103 | 11/1937 | Cox | 427/119 |
| 2,387,498 | 10/1945 | Cox | 427/119 |
| 3,406,126 | 10/1968 | Litant | 252/511 |
| 3,433,682 | 3/1969 | Kalmen | 428/408 |
| 3,573,086 | 3/1971 | Lambden | 428/408 |
| 3,855,174 | 12/1974 | Brie et al. | 428/391 |
| 4,046,939 | 9/1977 | Hart | 428/408 |
| 4,132,828 | 1/1979 | Nakamura | 427/113 |

*Primary Examiner*—James J. Bell
*Attorney, Agent, or Firm*—Wegner, Stellman, McCord, Wiles & Wood

[57] ABSTRACT

An electrically conductive article comprises an insulating material, preferably polyurethane or a similar plastic material, with a plurality of thinly coated electrically conductive fibers dispersed randomly and uniformly therethrough. The fibers are thinly coated with a lubricating cohesive silicone oil or equivalent material which adheres to the fibers and repels the insulating material, thereby preventing encapsulation of the fibers and rendering the coated fibers mutually attractive to define conductive paths through the article even at extremely low fiber loadings.

17 Claims, 4 Drawing Figures

40X ZERO ELONGATION

40X APPROX. 10% ELONGATION

40X APPROX. 15% ELONGATION

40X RELAXED

ELECTRICALLY CONDUCTIVE ARTICLE AND METHOD OF MAKING THE SAME

BACKGROUND OF THE INVENTION

1. Field of the Invention

This invention relates to electrically conductive articles and, more specifically, this invention relates to flexible, electrically conductive articles of polyurethane or similar plastic material.

2. Description of the Prior Art

Accumulation of static electrical charge in certain working environments has long been recognized as undesirable. Unfortunately, many widely used synthetic polymers, such as polyurethane and polyvinyl chloride, for example, are electrical insulators and articles of these materials thus may easily accumulate a substantial static electrical charge. Such an accumulation of charge may attract dust which may adversely affect the quality of manufactured products. Further, static electrical discharge may disturb the performance of electromagnetic machines, such as computers, in the vicinity of the discharge. In environments such as grain elevators, for example, fire or explosion may result from such discharge.

It has long been known that articles of electrically conductive material will, if grounded, dissipate static electricity as acquired. In the past, synthetic and natural polymers have been rendered electrically conductive by the incorporation of conductive particles therein. For example, particles of carbon black or copper powder may be mixed with a polymer before forming thereof into a desired article. Incorporation of particles of hygroscopic material into a polymer results in adsorption of moisture from the air onto the polymer surface to prevent the build-up of static charges.

However, particles mixed with a polymer tend to become encapsulated or otherwise separated from adjacent particles by the polymer. Therefore, relatively high particle loadings are required to effectively render the polymer electrically conductive. When a hygroscopic material is added to a polymer, control of the amount of moisture adsorbed on the polymer is very difficult or impossible, due to variability of the relative humidity of the air. In dry weather, insufficient moisture may be adsorbed to prevent static charge build-up.

Litant U.S. Pat. No. 3,406,126 issued Oct. 15, 1968, the disclosure of which is hereby incorporated by reference, discloses a method of rendering an article of synthetic resin electrically conductive by uniformly and randomly dispersing therethrough between about 0.05% and 5%, by weight, of carbon yarn fibers of between $\frac{1}{4}''$ and $\frac{3}{4}''$ in length, and about 10 microns in diameter. The fibers must have a very high length-to-diameter ratio (between about 640:1 and 1920:1) and have elastic recovery characteristics sufficient to assure that the fibers regain a linear configuration after distortion, such that fiber-to-fiber contact throughout the mass is assured. The fibers must be mixed with polymer in low shear machinery in order to prevent undesirable shortening of the fibers.

At low fiber loadings, it is necessary to mix a highly polar plasticizer with the polymer to enhance the article's conductivity. It is apparent from the Litant disclosure (see col. 10, lines 50-64) that, at fiber loadings of about 3 weight % or less, the resistivity of the article increases with decreasing fiber loadings to an undesirable level. The addition of a polar plasticizer is required to maintain resistivity below about 1,000 ohm-cm at fiber loading of 0.5%. This level is undesirably high for some applications.

Further, tests conducted on articles made according to the Litant disclosure indicate that conductivity of the articles decreases with repeated distortion of the articles, making such articles unsuitable for use in applications requiring continual or repeated flexing.

SUMMARY OF THE INVENTION

The present invention is directed to overcoming one or more of the problems described above.

According to the present invention, an electrically conductive plastic article comprises a non-conductive material, preferably a synthetic resin, having a relatively low weight percentage of pretreated conductive fibers dispersed randomly and effectively uniformly therethrough.

More specifically, an insulating resin, such as polyurethane, polyvinyl chloride or the like, has a relatively low weight percentage of carbon yarn or other conductive fibers up to about $\frac{1}{8}''$ in length and about 8 microns in diameter dispersed therethrough. Each fiber is thinly coated with a cohesive lubricating material which adheres to the fiber material and repels the resin. A suitable fiber coating material is silicone oil, preferably a dimethyl polysiloxane.

An article made according to the invention exhibits high conductivities at even very low fiber loadings. If desired, high shear mixing equipment may be utilized in preparing the article. The conductivity of an article made according to the invention is unaffected by stresses imposed by repeated or continued distortion of the article. The term "article" is used herein in the broadest possible sense, and includes such articles as a coat of paint.

DESCRIPTION OF THE PREFERRED EMBODIMENT

Figure 1:
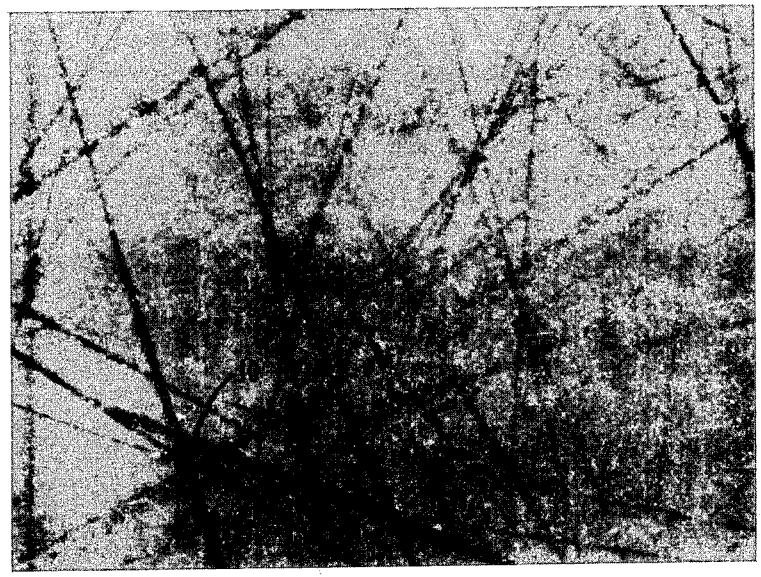
FIG. 1 is a photomicrograph taken at approximately 40X enlargement of a cross-sectional surface of an article made according to the present invention, with the article in an unstressed state.

According to the present invention, articles formed from electrically nonconductive starting materials such as natural or synthetic rubber or polyurethane, polyvinyl chloride, or other synthetic resins are rendered electrically conductive and thus incapable of retaining a static electrical charge. The starting material or a chemical precursor thereof must be one with which an electrically conductive solid additive may be mixed while the starting material or precursor is in liquid form. Conveyor belts, timing belts and carpet backing are examples of flexible articles desirably having anti-static properties which may be made according to the invention.

While the invention is especially useful when embodied in an article of an electrically insulating material, it is to be understood that the invention is not limited to articles of such materials, but may find utility in enhancement of the conductivity of materials having low or moderate conductivity.

It is to be understood that the electrically nonconductive material need not be flexible, but may comprise any of a wide range of moldable material, including those which are rigid after molding. However, the preferred form of the invention is embodied in a flexible article, the resistivity of which is not affected by repeated or continual distortion.

By the process of the present invention, a moldable insulating material is rendered electrically conductive by randomly and effectively uniformly dispersing precoated electrically conductive filaments, such as carbon yarn fibers, for example, throughout the material. The filaments are coated with a selected cohesive lubricating material, such as silicone oil, which adheres to the filaments yet repels the insulatihg material.

Although filaments of any conductive material may be utilized with advantage, filaments of resilient material are preferred. One highly preferred electrically conductive material is fibrous carbon yarn, as described in Kauffman et al. U.S. Pat. Nos. 2,796,331 and Litant 3,406,126, which is easily handled and cut or chopped to desired lengths. The conductivity of the product article is dependent upon the conductivity of the filaments incorporated in the article and, within limits, on the fiber loading values.

The fibers are preferably between 1/20" and $\frac{1}{8}$" in length, and are typically between about 2 and 13 microns in diameter, with 7 to 9 microns being a preferred diameter. It has been found that the utilization of coated filaments of less than about $\frac{1}{8}$" in length results in very high conductivities (low resistivities) with fiber loading values as low as about $\frac{1}{2}$% by weight. Fibers longer than about $\frac{1}{8}$" are not easily processed under high shear conditions, and are thus not preferred.

In addition to carbon yarn, it has been found that graphite fibers, as well as other conductive non-metallic and metallic fibers may be used in this invention. It is to be emphasized that the invention does not depend upon the specific type of fiber used.

Although Litant U.S. Pat. No. 3,406,126 discloses that conductivity may be imparted to an otherwise insulating resin by dispersing carbon yarn fibers therethrough, the resistivities of articles made according to the teachings of Litant tend to be undesirably high (around 1,000 ohm-cm or more) at fiber loadings of less than about 2%–3% by weight unless about 1–20 weight percent of a highly polar plasticizer, such as orthonitroanisole, is mixed with the resin-carbon fiber composite. Further, Litant's teachings require a minimum fiber length of $\frac{1}{4}$", which has been found to be too long for use in high shear mixing equipment.

It has been found that conductive fibers coated with certain materials, identified below, when incorporated in a normally nonconductive material, impart electrical conductivity to the insulator at fiber loadings as low as $\frac{1}{2}$%, by weight. The fibers may be as short as 1/20", and are preferably no longer than $\frac{1}{8}$", both lengths being substantially shorter than the $\frac{1}{4}$" minimum length required by Litant. The use of efficient, high shear mixing equipment to prepare a fiber-bearing resin for molding is possible with the relatively short fibers of the invention.

A sufficient quantity of fibers must be mixed with the insulator to ensure contact between each fiber and adjacent fibers in order that continuous conductive paths are defined throughout the insulator. When fibers are distributed randomly throughout the mass, the resulting article will typically be conductive in multiple directions.

A wide variety of fiber coating materials are suitable for use in the invention. The coating material must adhere to the filament material, yet repel the surrounding insulator, and must be cohesive to ensure that the insulator does not encapsulate individual fibers but, rather, that each coated fiber maintains contact with adjacent fibers.

Preferred fiber coatings are silicone oils, generically referred to as organopolysiloxanes. Such compounds are cohesive, have desirable lubricating properties, adhere to fibers of carbon yarn or other carbon-containing materials, and repel polyurethane, polyvinyl chloride and other resins typically used in the invention.

Nonsubstituted organopolysiloxanes, commonly referred to as release agents, are highly preferred. Such release agents include alkyl or aryl siloxane polymers such as methylethyl polysiloxane, dimethyl polysiloxane, diethyl polysiloxane, etc. Less preferred, but useful, coating materials include phenyl-substituted polysiloxanes and fluoro-chloro substituted polysiloxanes, which enhance lubrication capabilities of the article, yet maintain sufficient adherent qualities to be useful. Any coating material used must adhere well to the filaments.

Fibers are coated with silicone oil or another coating material by simple mixing, either before or after the fibers are chopped or cut to their desired length. Due to the insulating characters of silicone oils, it is necessary that the silicone oil fiber coating be as thin as possible, yet retain its lubricity.

For ease of mixing, and to obtain as thin a silicone oil as possible, the silicone oil is first mixed with a suitable solvent, such as methylene chloride, for example, to decrease the viscosity of the silicone oil, which is normally quite viscous at room temperature. After the fibers are coated, excess silicone oil solution is removed, and any remaining solvent is readily removed by the application of moderate heat.

While coated fibers may be mixed with insulator material by any suitable method, it is preferred that fibers be mixed with the polymer in its liquid state or in solution, or with an uncured, liquid polymer precursor followed by curing of the precursor, either by heat or the addition of a curing or cross-linking agent, to form a resin. The use of high shear mixing equipment provides high speed, efficient mixing of fibers less than about $\frac{1}{8}$" in length with a resin precursor or liquid resin.

For example, coated fibers may be mixed with a liquid urethane "pre-polymer" having approximately 1,000 monomer units per molecule, followed by addition of a diamine or equivalent cross-linking or curing agent which promotes further polymerization of prepolymer to form polyurethane, as is well known in the art.

Alternately, fibers may be mixed with a heat curable liquid resin, such as plasticized polyvinyl chloride, followed by curing and molding.

The following examples will serve to clearly illustrate the practice of the invention.

EXAMPLE 1

A quantity of carbon yarn fibers, $\frac{1}{8}$" in length and about 8 microns in diameter, were coated with a dimethyl polysiloxane oil and incorporated by mixing into a polyurethane precursor liquid in an amount calculated to result in a polyurethane resin having 1% by weight of coated carbon yarn fibers. The polyurethane precursor was then reacted with a diamine cross-linking agent to form product polyurethane which was then molded to form a 1/32" thick strip.

A voltage of 110 V. was placed across the strip, and a substantial temperature rise was observed. A lamp was connected to one end of the strip and it was found that current flowing through the strip energized the lamp.

The resistivity of the strip was measured to be about 350 ohm-cm at 25° C. ambient temperature.

A similar experiment was carried out with carbon yarn fibers which were previously washed with toluene and chloroform, and to which no silicone coating was applied. A 1/32" thick strip of polyurethane was fabricated with 1% by weight of fibers incorporated therein. The resistivity of the material was measured to be about 50,000 ohm-cm at 25° C. ambient temperature. The results of this example indicate that, at low fiber loadings, relatively short (about ⅛") fibers require a silicone oil, or equivalent, coating to ensure contact between adjacent conductive fibers to define continuous conductive paths throughout the insulator matrix.

EXAMPLE 2

A polyurethane belt was fabricated according to the disclosure of Litant using 1% by weight of ¾" length uncoated carbon yarn. The fiber-bearing polyurethane material was difficult to manipulate in the molding process. Conductivity was determined to be spotty. After flexing of the belt, conductivity across the belt was increased by about 4 times. After repeated bending (up to 12 times) no conductivity was observed. It is the inventor's theory that adjacent fibers were pulled apart by the surrounding polyurethane, thus destroying the conductive paths within the belt.

EXAMPLE 3

Figure 2:
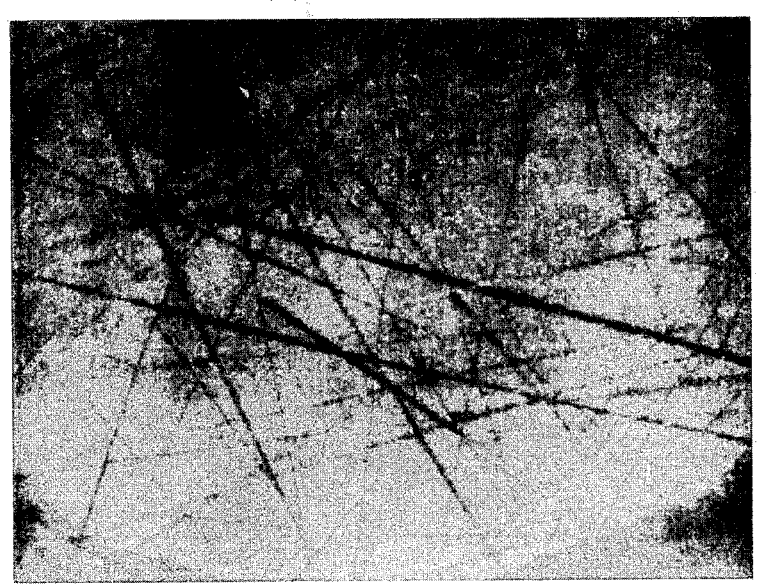
FIG. 2 is a photomicrograph of the article of FIG. 1 at approximately 10% elongation.

The beneficial effects imparted by the lubricity and adherence of the fiber coating material to the fibers of the invention are illustrated with reference to FIGS. 1-4, which are photomicrographs of a cross-sectional surface of the polyurethane belt of Example 1. FIG. 1 shows the random distribution and substantially linear configuration of fibers incorporated in the polyurethane. In FIG. 2, the belt is subjected to approximately 10% elongation. It is observed that relative movement has occurred between a typical fiber 10 and the surrounding polyurethane, as evidenced by the elongate cavity 12.

Figure 3:
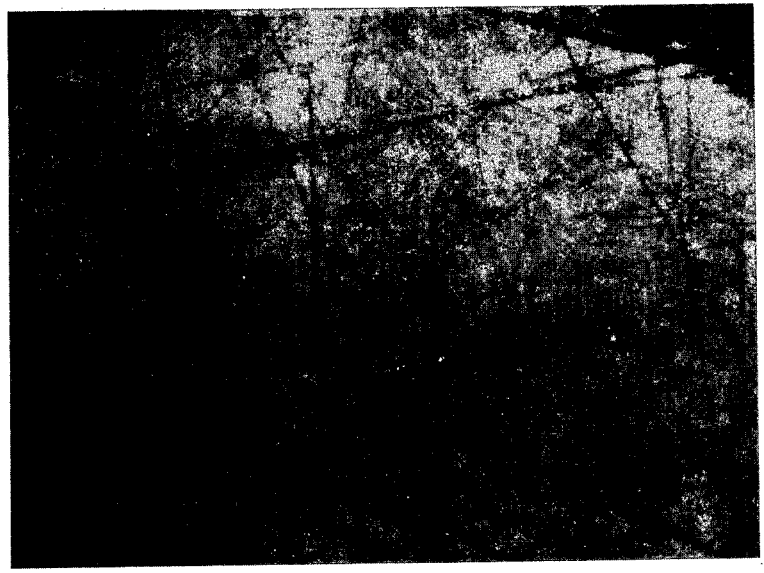
FIG. 3 is a photomicrograph of the article of FIGS. 1 and 2 at approximately 15% elongation.
Figure 4:
FIG. 4 is a photomicrograph of the article of FIGS. 1 through 3 in a relaxed state after approximately 25% elongation.

Referring to FIG. 3, which shows the belt of FIGS. 1 and 2 at approximately 15% elongation, the increased size of the cavity 12 is apparent. FIG. 4 shows the belt of FIGS. 1-3 in a relaxed state after being elongated by 25%. The fibers have returned to their original configuration within the polyurethane.

It is believed by the inventor that the lubricating quality of the fiber coating materials prevents surrounding resin from pulling adjacent fibers apart, thereby preventing loss of conductivity during elongation or bending. This is especially important in applications wherein the article must undergo constant flexing, as in conveyor belt or timing belt applications.

It was observed that 25% elongation of the belt did not diminish conductivity, but that 100% elongation resulted in a total loss of conductivity. However, after relaxation, conductivity was restored. With the application of substantial (110 V.) voltage across the belt, it was noted that the belt heated only during relaxation or a partially elongated state, but that it cooled when elongated by 100%, thus confirming that conductivity is lost at a certain maximum elongation.

EXAMPLE 4

Heavy duty polyurethane material typically having a resistivity of between about $10^7$ and $10^9$ ohm-cm was prepared as in Example 1 with the addition of varying weight percentages of carbon yarn fibers coated with dimethyl polysiloxane oil. The fibers were ⅛" in length and about 8 microns in diameter.

The material exhibited the following resistivities:

| Example No. | Wt. % Fibers | Resistivity at 25° C. (ohm-cm) |
|---|---|---|
| 4A | >2%* | — |
| 4B | 2% | 70 |
| 4C | 1% | 350 |
| 4D | ½% | 500 |
| 4E | ¼% | 10,000 |

*Mixing of the fibers and polymer precursor was impractical.

Example 4 demonstrates that resistivity of an article made according to the invention is desirably low (e.g. well below 1,000 ohm-cm) at fiber loadings of as low as ½%, without the addition of polar plasticizing materials to the resin-fiber composite.

It is believed that the use of fibers shorter than ⅛", as short as about 1/20", for example, results in decreased resistivity compared to the values of Example 4, and that resistivity may remain below about 1,000 ohm-cm at fiber loadings of substantially less than ½% with the use of fibers as short as 1/20".

An additional advantage of the invention is that the surface of an article containing coated fibers becomes lubricated by extension of the fibers to the article surface and by "sweating out" of lubricating material through the resin.

The foregoing detailed description is given for clearness of understanding and no unnecessary limitations should be understood therefrom, as modifications will be obvious to those skilled in the art.

I claim:

1. An electrically conductive article which is effectively incapable of holding a static electric charge, comprising:
   a flexible mass of resilient insulating material having resilient conductive filaments distributed randomly and effectively uniformly therethrough to define a plurality of continuously conductive paths entirely through said mass, and a thin coating on each said filament of a cohesive lubricating material which is adherent to said filaments and repellant to said insulating material.

2. The electrically conductive article of claim 1 wherein said insulating material is a synthetic polymer.

3. The electrically conductive article of claim 2 wherein said synthetic polymer is selected from the group consisting essentially of polyurethane and polyvinyl chloride.

4. The electrically conductive article of claim 3 wherein said plastic material is polyurethane.

5. The electrically conductive article of claim 3 wherein said plastic material is polyvinyl chloride.

6. The electrically conductive article of claim 1 wherein each said filament is between about 1/20" and ⅛" in length.

7. The electrically conductive article of claim 6 wherein each said filament has a diameter between about 2–13 microns.

8. The electrically conductive article of claim 7 wherein the diameter of each said filament is between about 7–9 microns.

9. The electrically conductive article of claim 1 wherein said filament coating material comprises a silicone oil.

10. The electrically conductive article of claim 9 wherein said silicone oil comprises an organopolysiloxane.

11. The electrically conductive article of claim 10 wherein said silicone oil comprises dimethyl polysiloxane.

12. The article of claim 1 wherein said filaments comprise between about ½% and 2%, by weight, of said article.

13. A flexible, electrically conductive article which is effectively incapable of holding a static electric charge, comprising:
   a flexible mass of resilient polyurethane; and,
   a plurality of carbon yarn filaments dispersed randomly and effectively uniformly through said polyurethane mass to define a plurality of continuously conductive paths entirely through said mass, each said filament being between about 1/20" and ⅛" in length and between about 2–13 microns in diameter, and a thin coating on each said filament of an organopolysiloxane oil.

14. The electrically conductive article of claim 13 wherein said filaments are between about 7–9 microns in diameter.

15. The electrically conductive article of claim 13 wherein said oil comprises non-substituted dimethyl polysiloxane.

16. The electrically conductive article of claim 13 wherein said filaments comprise between about ½% and 2%, by weight, of said article.

17. A method of making a flexible, electrically conductive article of a synthetic resin which has resilient filaments of conductive material dispersed therethrough and which is effectively incapable of holding a static electric charge, said method comprising the steps of:
   (a) thinly coating each of a plurality of said resilient filaments of conductive material with a cohesive lubricating material which adheres to the material of said filaments and repels said synthetic resin;
   (b) blending said plurality of coated filaments with a non-conductive starting material or precursor in a liquid state to obtain an effectively uniform random dispersion of said filaments through said starting material or precursor to provide a mixture; and
   (c) forming a flexible, substantially solid mass from said mixture.

* * * * *